Patented Feb. 9, 1932

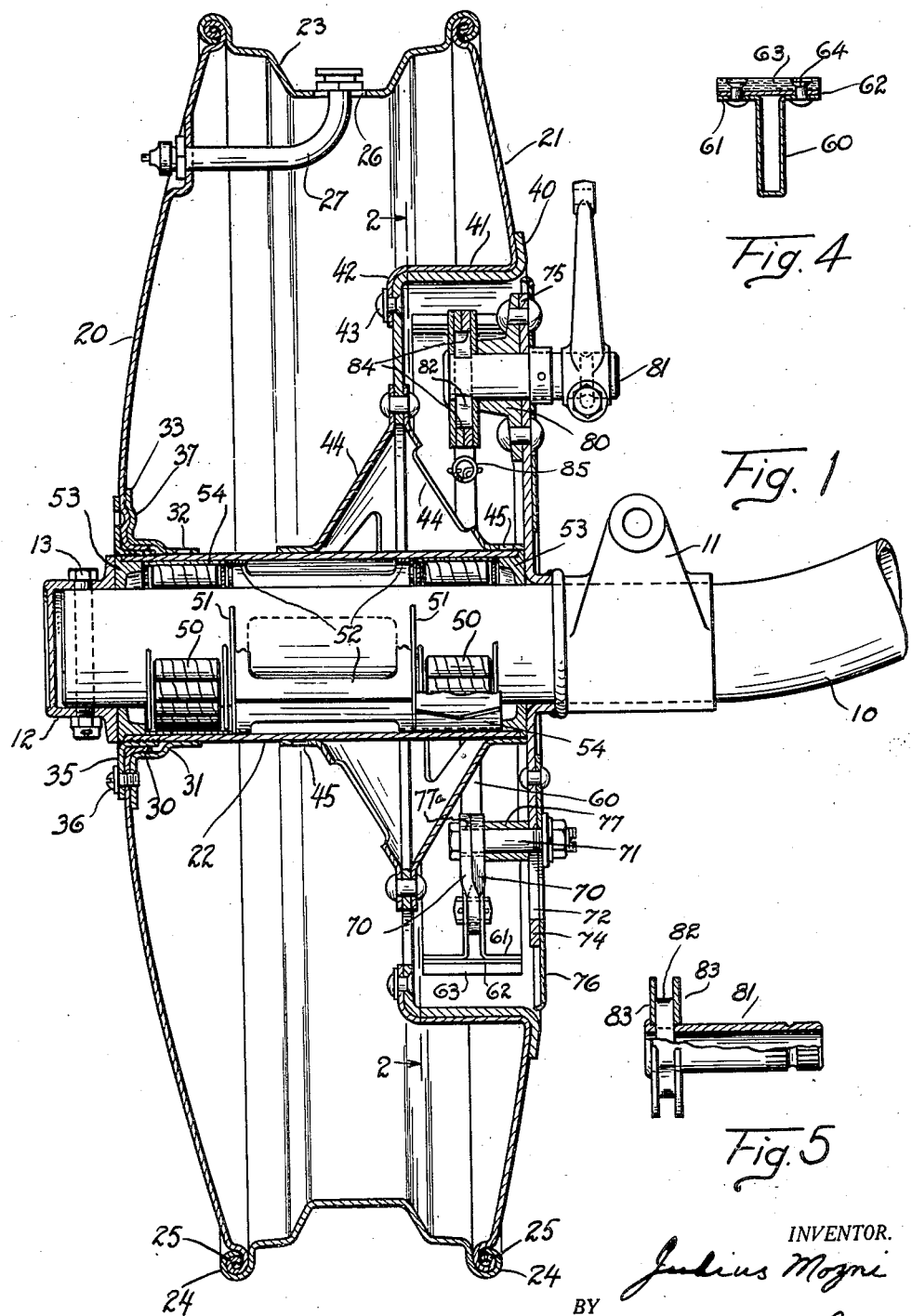

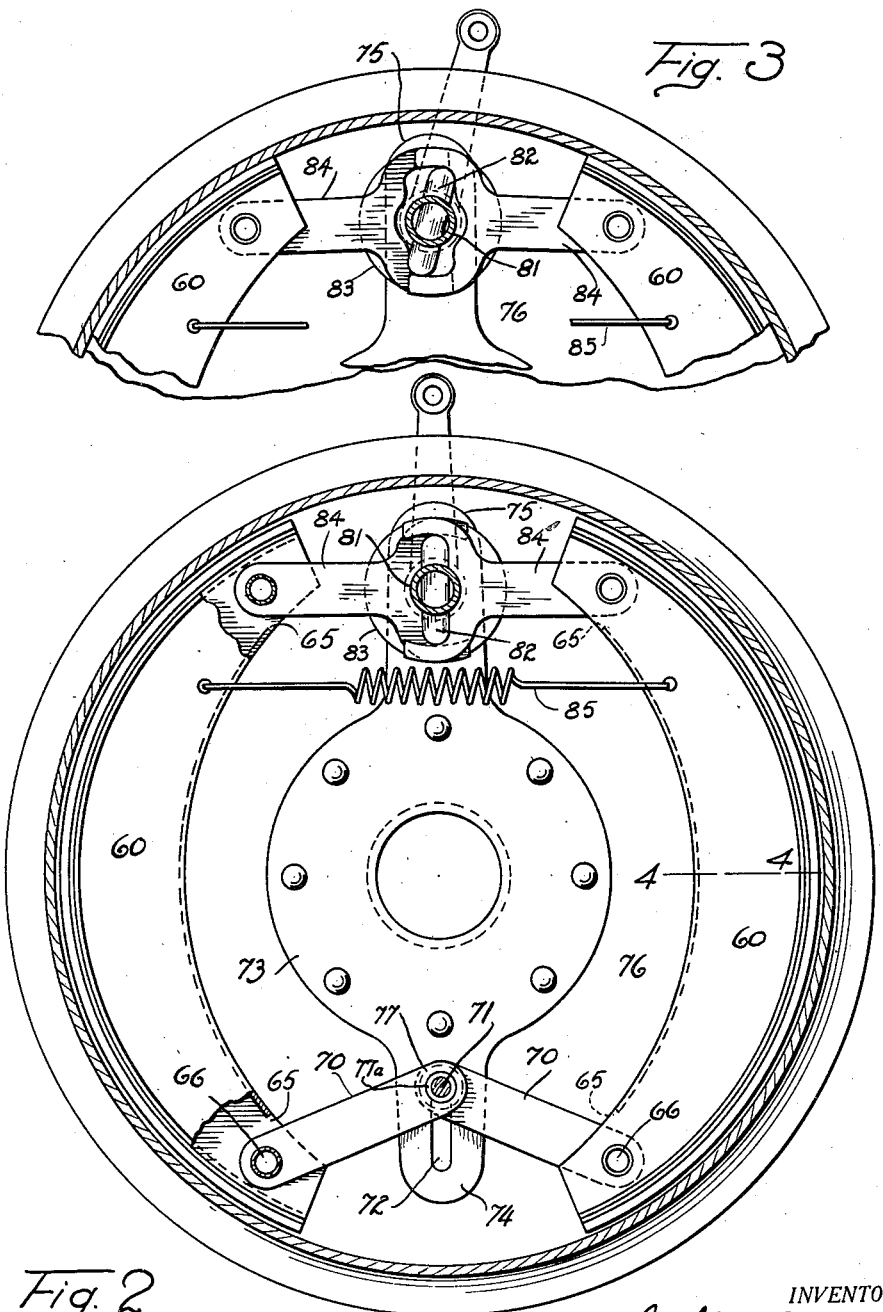

1,844,100

UNITED STATES PATENT OFFICE

JULIUS MOZNI, OF DETROIT, MICHIGAN

WHEEL FOR AIRPLANES

Application filed October 17, 1928. Serial No. 312,950.

The present invention relates to wheels particularly adapted for airplanes and to wheels of this character provided with brake mechanism and relates also to the brake mechanism suitable for such purpose.

Among the objects of the invention is a wheel which shall be simple in construction, as light as is consistent with strength, and one that can be easily and economically constructed.

Another object is a wheel of the type indicated which shall involve the use of the recently discovered light alloys which are not susceptible of welding.

Still other objects include a simple, easily constructed and light brake for such wheels capable of easy adjustment.

Still other objects will readily occur to those skilled in the art upon reference to the following description and accompanying drawings, in which Fig. 1 is a diametrical vertical section through the wheel and hub showing the construction thereof.

Fig. 2 is a section on line 2—2 of Fig. 1 but with the inside wheel disc removed.

Fig. 3 is a fragmentary view similar to Fig. 2 but showing the brake parts in braking position.

Fig. 4 is a section of the brake shoe on line 4—4 of Fig. 2.

Fig. 5 is a partly sectional detailed view of the brake operating cam member.

Referring to the drawings, the wheel is shown as mounted upon an axle member 10 which may be tubular or solid but preferably tubular for lightness. This axle member is provided with a collar 11 to which may be secured the struts (not shown) for supporting the airplane and also a cap member 12 secured to the end thereof as by a bolt 13. Of these members, the cap is provided on the face next to the wheel with a smooth surface adapted to act as a thrust bearing to prevent the movement of the wheel longitudinally of the axle member, while the collar 11 has welded thereto an anchor member 73 to be described later.

The wheel itself is composed of an outer disc 20 and an inner disc 21, mounted upon a tubular hub member 22. The discs 20 and 21 are preferably made of one of the recently discovered lighter alloys such as duralumin and therefore are not susceptible of welding. Consequently, means is provided for attaching the discs to the hub member 22 and to the rim 23 which means will be described in detail.

The rim 23 is preferably of the deep channel type and may be formed of duralumin also or made of steel. It is preferably rolled to its proper section form with the edge portion 23 extending outwardly, and the disc 20 is preferably provided with a mating edge portion 24 also extending outwardly, the two edge portions being subsequently, by means of a suitable die, rolled in together upon each other to form a tubular bead which effectively holds the parts together and presents a smooth bead for contact with the tire wall.

The rim member 23 is preferably formed into circular form during the rolling process and the ends may be abutted together without securing them or they may be secured together if desired. In cases where they are not secured together the formation of the beads above mentioned effectively holds the ends in alignment and when the tire is in position there is no tendency, or practically none, for them to move out of alignment.

At a suitable point on the rim 23 an opening may be provided for the passage of the valve stem 27 and the disc 20 may likewise be provided with a suitable opening so that the curved stem 27 may extend to the outside of the disc 20 and be accessible.

The disc 21 at its outer edge will also be provided with a flange 25 and this may be rolled into a bead with the edge 24 and the rim 23 in the same manner as described for disc 20. The central portion of the disc 21, however, will be secured in a different fashion to the hub 22 as will be described later.

The central portion of disc 20 will be provided with a flanged opening, with the flange extending inwardly as shown at 30. This flange 30 extends into a collar 31 which is placed over the tube 22 and welded thereto. The tube 22 is preferably of steel while the collar 31 will also be of ferrous metal weldable to the tube 22. One of the welding spots is indicated at 32.

As mentioned above, the flange 30 of the disc 20 extends into the collar 31 which latter is provided with an outwardly extending flange 33 and the portion of the collar that is welded to the tube 22 is somewhat smaller in diameter than that portion next to the flange 33. After the disc 20 has been placed in the position mentioned a second steel collar 35 is placed in position over the flanged portion of disc and secured to the end of tube 22 so that the disc lies between the outwardly extending flanges of collar 31 and collar 35. It is preferred to thread the end of tube 22 and the inner surface of collar 35 so that the latter is in effect a nut which may be screwed down tightly on the end of the tube 22 and locked against rotation by means of a screw 36 extending through the two collars and the disc.

Before placing the collar 35 in position it is preferred to indent the flange 33 and the disc 20 together as shown at 37 so that any tendency to relative movement between these parts is prevented by means of the indentations. The nut 35 is then secured tightly into place and fixed against angular movement by the screw 36.

The disc 21 is preferably formed with a central opening large enough to receive the cup-shaped brake drum 40 and will be provided with an inwardly extending cylindrical portion 41, which will be flanged at its inner edge as at 42. The brake drum 40 will then be riveted to the flange 42 as at 43.

It is preferred to support the brake drum 40 directly on the tube 22 and it in turn supports the disc 21. The drum 40 is preferably supported on the tube 22 by means of two flanged cone-shaped members 44 and 45 which will be fitted on over the tube with their larger portions toward each other with the drum 40 between and will be welded in place on tube 22 as indicated by the slots 45. The drum and cone members will be riveted together as indicated.

In order to provide anti-friction means within the tube 22 to permit free running of the wheel, roller bearings 50 will be inserted in each end of the tube 22 and these will preferably abut against plates 51 which in turn are spaced apart by a suitable spacer 52. The latter may consist of a sheet metal piece punched out for lightness and rolled into cylindrical form, which member will lie within the tube and separate the plates 51. After the bearings 50 have been put into the tube 22 a suitable retaining member 53 may be inserted in each end thereof. There may be also used within the tube 22 thin hardened steel bearing races 54 which are held in position between the plates 51 and the member 53 so as to furnish suitable rolling surfaces for the rollers of the bearings 50.

While roller bearings have been described and shown it is of course, obvious that any suitable type of anti-friction member may be substituted therefor.

The brake mechanism is shown in elevation in Figs. 2 and 3 and in section in Fig. 1. This mechanism consists of two shoes 60 which will be substantially alike and, which it is preferable to form of a suitable blank of duralumin formed into channel shape as shown in Fig. 4 which channel is provided with flanges 61. The open side of the channel is then covered with a flat strip of similar metal 62 and the brake band lining 63 is then riveted to the channel member with the rivets 64 passing through the three parts, that is, the lining, the plate, and the flanges 61. Near each end of the brake shoe the closed side of the channel will be slotted as indicated at 65 so that the several links connected thereto may be inserted in the channel and pivoted therein by suitable rivets or pins 66.

The shoe 60 will be carried by the links above mentioned, two of which, 70, are attached to the lower ends of the shoes and are secured at their other ends to a bolt 71 which passes through a slot 72 in the anchor member 73. This anchor member consists of a small disc of steel having diametrically opposite ears 74, one of which contains the slot 72 and the other of which, 75, is perforated for the reception of the cam shaft to be described later. This anchor member 73 has riveted thereto a plate 76 of duralumin which serves to cover the open side of the brake drum and prevent entrance of foreign material. This cover plate 76 is for this purpose only and does not take any load.

The bolt 71 extends through the anchor member and cover plate and carries a spacer 77 so that the two links 70 are spaced from the cover plate and located near the medial plane of the brake drum and therefore in alignment with the channel portion of the shoe 60. The bolt 71 also carries a short spacer 77a which may be integral with or separate from the spacer 77. This spacer 77a extends through links 70 and permits tightening of the bolt 71 without interfering with the free movement of the links. The slot 70 through which the bolt 71 passes is located vertically so as to bisect the angle between the links 70 and so that when the bolt 70 is moved up or down in the slot the distance between the lower ends of the shoes 60 and the drum will be varied. Such an arrangement provides a convenient adjustment for the brake.

The upper ear 75 of the member 73 is provided with a sleeve member or bearing bushing 80 riveted thereto serving as a bearing for a shaft 81 carrying the brake operating cam 82, the shaft and cam being preferably constructed as indicated in Fig. 5. As shown in this figure the shaft has the cam 82 secured to one end thereof between two plates 83 which serve to maintain links 84 in contact with the cam 82. The links 84 are pivoted in the upper end of the brake shoe 60 and each is formed in the fashion of a fork member with the forks displaced laterally so that both forks lie between the plates 83 when the brakes are assembled. The cam consists of a piece of steel approximately square in section and of a length several times that of its width and having its ends rounded. This piece is inserted through suitable slots in one end of the tubular shaft 81 so that the cam contour presents substantially parallel sides with the circle of the shaft laid thereon. This contour is shown most clearly in Fig. 3. The forks on the links 84 are so shaped that when the cam is in vertical alignment and the forks pressed against it a snug fit is had. With a comparatively strong spring 85, the two forks and cam acting in conjunction maintain the upper ends of the brake in position shown in Fig. 2.

The operation of the brake seems entirely obvious from the foregoing description so that no statement thereof will be thought necessary.

Now having described the invention and the preferred form of embodiment thereof, it is to be understood that the said invention is to be limited, not to the specific details herein set forth but only by the scope of the claim which follows:

I claim:—

In a disc wheel, a tubular hub, a radially flanged cylindrical collar welded to said hub, a second radially flanged cylindrical collar telescoped within the first collar and threadedly secured to said hub, said flanges being longitudinally spaced from each other, and a disc having a central portion disposed between said flanges and secured against the flange of the welded collar by the flange of the threaded collar, and means to fix said flanges and said disc against relative rotary movement.

JULIUS MOZNI.